Figure 1:
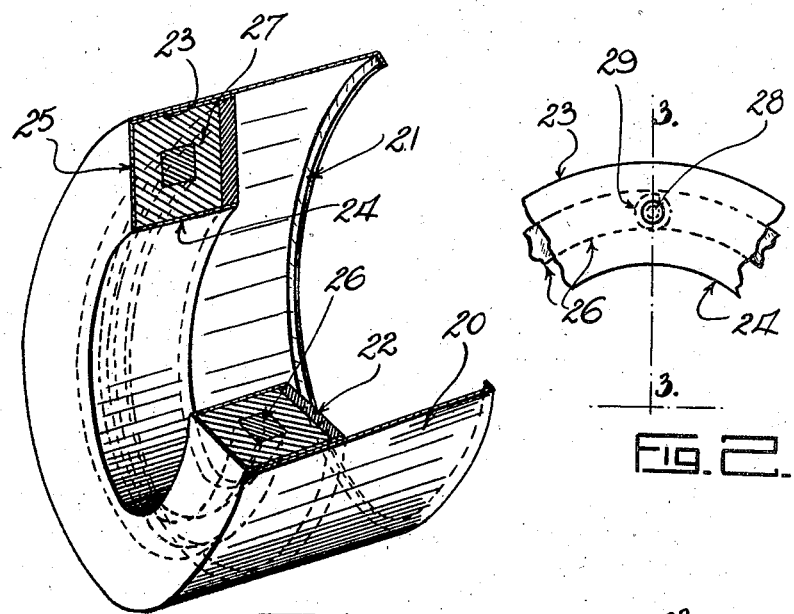

Feb. 8, 1927. 1,617,218

B. NEWTH ET AL
ELECTRIC BATTERY FOR CLOCKS
Filed June 4, 1925  2 Sheets-Sheet 1

Inventors
Basil Newth
Octavia Newth
By
Attorney

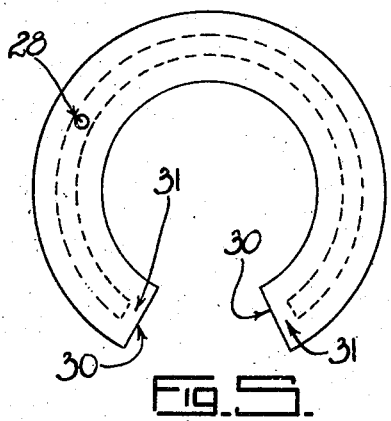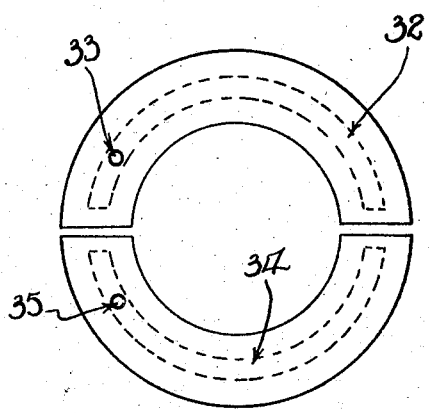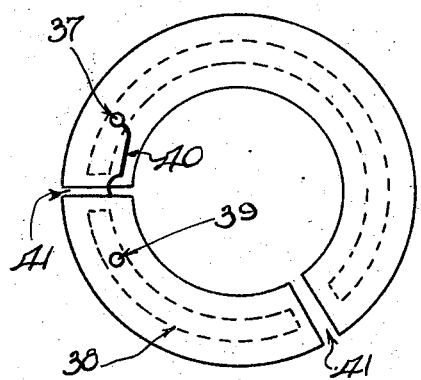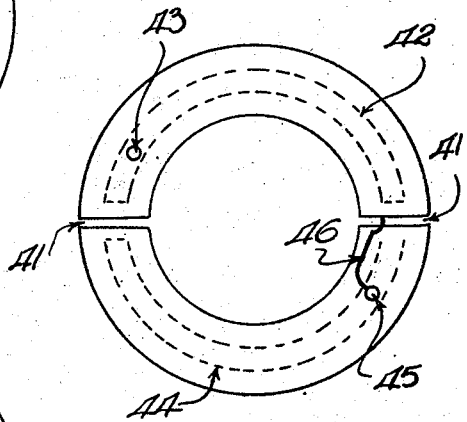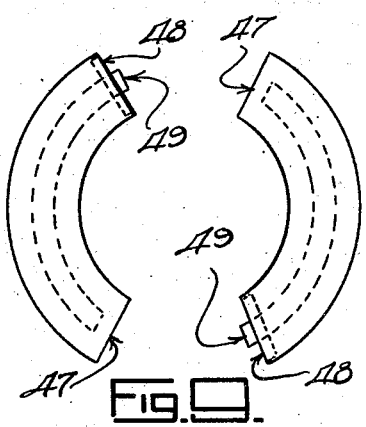

Patented Feb. 8, 1927.

1,617,218

UNITED STATES PATENT OFFICE.

BASIL NEWTH AND OCTAVIA NEWTH, OF SYDNEY, NEW SOUTH WALES, AUSTRALIA.

ELECTRIC BATTERY FOR CLOCKS.

Application filed June 4, 1925, Serial No. 34,949, and in Australia July 7, 1924.

These improvements refer to dry batteries required for the maintenance of the movement in self-contained electric clocks with or without associated mechanism inclusive such as for telling the hours on a gong, exhibiting dates, ringing an alarm at set times, and the like.

More specifically, these improvements relate to batteries required for electric clocks in which the movement is synchronized by a spring-held balance, rather than a swinging pendulum, which time pieces are "portable" as they keep time in all positions and while being moved and during sustained movement, such for instance as aboard ship.

And to batteries required for electric alarms in portable clocks.

Ordinarily balance-timed portable clock movements, with whatever alarm or striking or other mechanism included, are as much as possible compacted within the compass of a circular case. The form of the essential battery for maintenance of the time movement and what other mechanism is associated therewith which best accommodates to the least enlargement of the case enclosing the whole clock is that of an annulus, fitting closely within the circular case (with or without legs and pick-up) usual with portable clock movements, in a space reserved around or behind the movement of the clock.

In almost all of such clocks, access to the movement is from behind: With an annular battery in position this access from behind is effected, without removal of the battery, through the annulus; the otherwise exposed movement protected by a plain cover filling the opening, or, in the case of an alarm or striking clock, the gong, located centrally within the annulus of the battery, behind the movement; said cover or gong being readily removable, to expose the adjustments of the clock.

It is the object of this invention to provide improvements in dry batteries of the form and for the purposes herein mentioned.

As with dry batteries in general, the positive element, or zinc, is the container for the battery mixture or electrolyte, but this container is annular instead of the cylindrical or the rectangular shape in common use.

It is proposed in these improvements that the negative element or carbon shall also have the form of an annulus, so that the general cross-section of the improved battery shall be the same as the general cross-section of the common Leclanché type of dry cell when of rectangular form.

The improvements this invention comprises are not limited to a complete annulus; or to an annulus, complete or incomplete, comprising only one cell.

It is proposed to comprise, when required, more than one cell in this improved battery, each of such cells determining a segment only of the complete or incomplete annulus, so that the whole battery may comprise, as may be required, either separate cells for separate purposes or separate cells connected in series for whatever purpose may be required, such for example that of maintaining the time movement of the clock with one cell only and an associated electric alarm with this same cell with another cell in series in the circuit.

Referring to the accompanying two sheets of drawings illustrating these improvements in electric batteries for clocks:

In Figure 1 is shown a battery of the form of an annulus in position within a circular case for the movement of an electric clock, a sector being removed to afford greater clearness of illustration.

In the references to the drawings, and in the description following, the inner plane face of the annulus is the "front" of the battery.

Figure 2:
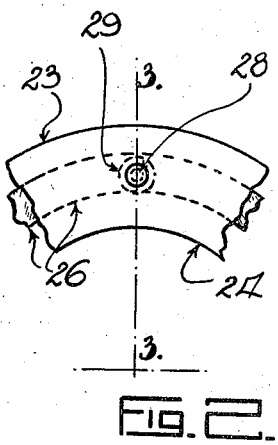
Figure 3:
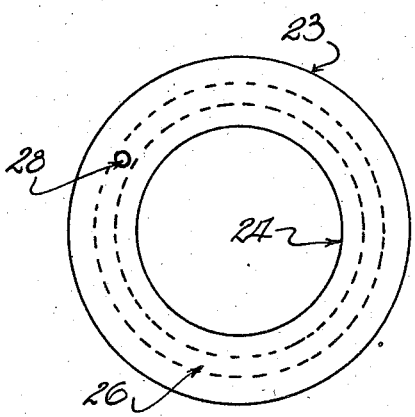

Figures 2 and 3 exhibit a special positive terminal, in full front view in Figure 2; in Figure 3 illustrated in cross-section on the line 3—3 in Figure 2.

The six figures following are all full front views of the battery drawn to a smaller scale.

Figure 4:
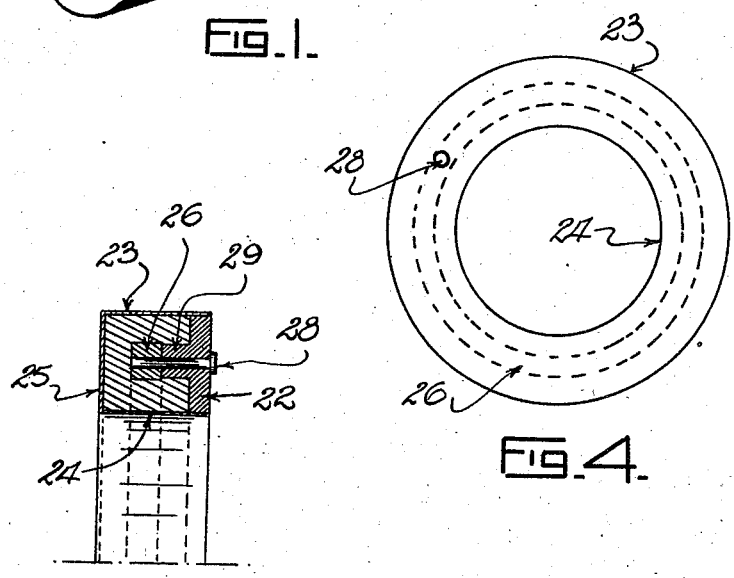

In Figure 4 the whole battery consists of a single cell only in the form of a complete annulus.

In Figure 5 the battery is one cell only, and the annulus is incomplete, as may be required.

In Figures 6, 7, and 8 the annulus is complete but comprises segments, each a separate cell, each with its own positive terminal.

Figure 6 illustrates provision for maintaining separate mechanisms in the electric clock, as for instance the time movement and a bell, independently, as may be preferred.

In Figure 7 an arrangement is illustrated the purpose of which is to maintain separate mechanisms where an inequality of battery force is desirable.

In Figure 8 the arrangement illustrated is purposed simply for multiplication of the battery force of a single cell.

In Figure 9 is exhibited an alternative provision for a positive terminal practicable where the annular segments comprising the battery are short.

In all these drawings and all through the description now following, the same numerals indicate the same or corresponding parts throughout.

As illustrated in Fig. 1 this improved battery has externally the form of an annulus or ring of (preferably) rectangular cross-section, preferably nearly square.

It is purposed that it should fit closely within a cylindrical clock case, in Fig. 1 represented by a right circular cylinder 20.

Such clock cases have ordinarily a flange 21 which retains a circular plate of glass protecting the face of the clock the movement of which it is the purpose of the circular case to enclose.

Ordinarily the annular container is open for filling and sealing on what would be the inward plane annular face with the annulus in position in the clock case.

The annular plane face 22, illustrated as, and understood to be, ordinarily, the pitch face of the battery, with the positive terminal or terminals projected from its surface, is according to all this description the front of the battery described.

As in the ordinary Leclanché type dry cell, the negative pole is supplied by a container for the electrolyte of a suitable element or compound, ordinarily zinc and hereinafter as zinc referred to, comprised by, in this invention, circular outer and inner walls 23, 24 and an annular plane face 25, this last definable as the back of the battery.

The negative element, of a suitable element or compound, ordinarily graphite and hereinafter referred to as the carbon is in this invention annular, preferably of rectangular cross-section, plain or fluted, 26.

As shown in Fig. 1, more clearly in the cross-sections exposed by the removal of a complete sector of both the flanged cylinder 20 and the annulus itself, the carbon ring is disposed centrally in the zinc container.

Considering filling these annular cells, as for comparison with the common dry cell, the annular plane face or back 25 becomes the bottom, and the front face 22 the top. Excepting as to the construction of the zinc container and of the carbon and the positive terminal connecting therewith, the material and process of manufacture is that of the ordinary dry cell of commerce.

The zinc is lined as usual, and there is the ordinary electrolyte mixture 27 with the carbon, surrounded with the ordinary depolarizing mixture, packed in this electrolyte in the ordinary way, and the usual covering 22 of pitch or other composition sealing the cell.

Describing positive terminals devised in this invention to suit the unusual conditions involved, and referring now to Figs. 2 and 3, a metal stub 28, preferably capped as shown, which may be fluted for a better fixing in the carbon, is held tightly therein so as to project on the outer surface of the pitch 22.

In filling in the electrolyte, after proceeding as far as placing the carbon 26 in position, a space 29 is left clear around the stub 28 for the covering composition 22 to fill into afterwards, thereby avoiding for the stud 28 contact with and erosion by the electrolyte mixture of the battery.

For the purpose for which this improved battery is intended, that is to say for closely compacted electric time-keepers with or without electric alarms associated, the annulus may be required complete (Figs. 4, 6, 7, 8) or incomplete (Figs. 5, 9) and in either event may be all one cell (Figs. 4, 5), in two cells (Figs. 6, 7, 8, 9), or more than two, in which last event preferably cells of the form shown in Fig. 9.

In Figs. 4 and 5 the battery is shown (in front view) in the form of a single cell. In Fig. 4 the annulus is complete, both the zinc container and the carbon being complete rings. In Fig. 5 the annulus is incomplete, plane zinc faces enclosing the otherwise open ends 30; the length of the incomplete carbon annulus is sufficiently less than that of the annular container to provide sufficient space 31 between the ends of the carbon and the ends 30 of the zinc container.

In each of these cases there is of course the one positive terminal 28 exposed on the pitch front.

In Fig. 6 the annulus comprises two distinct segments, each a separate cell; the segment 32 with the terminal 33, the segment 34 with its terminal 35, these terminals 33, 35 being identical in detail with the terminal 28 described.

The annular cells illustrated in Figs. 4 and 5 are purposed to maintain, in an electric clock, as well as the time movement, whatever mechanism in that clock associated therewith, as for example an alarm: The annular battery in Fig. 6 is purposed to maintain these different mechanisms independently, as for example one cell maintaining the time movement, the other an alarm.

For the purpose of completing the electric circuit in a way to utilize the battery for the purpose for which it is intended, it is being assumed that metal contact with the carbon terminal or terminals is effected on the positive side of the circuit with the mechanism or mechanisms in the movement and, up to this point, that the zinc container or containers and the general metal-work of the movement are in metal to metal communication, as for instance per medium of the enclosing clock case if of metal.

In the annulus as illustrated in Figs. 7 and 8, however, it is obvious that, in the case of one or the other of the two cells comprising the battery, as these cells are connected in series, there must not be metal to metal contact between the zinc containers and a metal clock case, or between these zinc containers.

Referring to Fig. 7 the annulus is seen to be divided unequally, into two segments forming separate cells, the segment 36 with the positive terminal 37 and the segment 38 with the positive terminal 39, and an electrical connection 40 is shown, between the terminal 37 of the segment 36 and the zinc container of the segment 38. In detail the terminals 37, 39 are identical with the terminal 28 described.

In this arrangement insulation is understood in the spaces 41 between the zinc ends of the two segments, and covering the outer wall of the cell 38 for the purpose of inhibiting metal to metal contact with the circular case.

The purpose in this arrangement is to maintain an electric time movement with one cell only, that is the larger segment 36, in a circuit between the positive terminal 37 and the zinc container of this cell, and some mechanism associated therewith, as for instance an electric bell, with both cells, in a circuit between the positive terminal 39 of the smaller segment 38 and the zinc container of the larger segment 36.

Referring to Fig. 8 the annulus is divided into two equal segments or separate cells, the segment 42 with its positive terminal 43, the segment 44 with its positive terminal 45, and an electrical connection 46 is shown, between the zinc container of the segment 42 and the positive terminal 45 of the segment 44. In detail the terminals 43, 45 are identical with the terminal 28 described.

In this arrangement insulation is understood in the spaces 41 between the zinc ends of the two segments, also covering the outer wall of one of the cells, in this case specifically the segment 42, to inhibit metal to metal contact with the cylindrical case.

In this arrangement the purpose is to maintain with both cells in series both an electric time movement and an associated alarm or striking mechanism, in a circuit between the carbon terminal 43 of the segment 42 and the zinc container of the segment 44.

Finally, referring to Fig. 9, illustrating shorter segments, as of a much less complete annulus than shown in Fig. 2 and moreover divided into two parts, or two widely separated segments (as shown), or of an annulus comprising three or more segments, an alternative construction is shown wherein, in each segment, both of the plane annular faces as well as the outer and inner walls of the container, are of zinc, but only one, 47, of the plane ends of the segments.

With these cells, filling is accomplished through the open ends 48, as in the case of the ordinary cylindrical dry cell, sealing afterwards at these ends with the pitch or other composition, the carbons projecting in the ordinary way carrying positive terminals 49 on their exposed ends clear of the pitch.

We claim:

1. A dry battery cell comprising a casing having the external form of a segment of an annulus and forming the positive element thereof, and a negative element in the form of a segment of an annulus embedded in the electrolyte contained in said casing.

2. A dry battery cell comprising a casing having the external form of a segment of an annulus and forming the positive element thereof, a negative element embedded in the electrolyte contained in said casing and a terminal connected to said negative element and projecting through a wall of said casing and insulated therefrom.

3. A dry battery consisting of a plurality of cells, each consisting of a casing in the form of a segment of an annulus and forming the positive element thereof and each containing electrolyte, a negative element embedded in the electrolyte in each of said casings and having a terminal projecting through a wall of its casing and electrically insulated therefrom, said cells being arranged end to end with their abutting ends insulated from one another and forming an annulus.

In testimony whereof we have hereunto set our hands.

BASIL NEWTH.
OCTAVIA NEWTH.